United States Patent [19]

Terry

[11] Patent Number: 5,090,855

[45] Date of Patent: Feb. 25, 1992

[54] LOCKING FASTENER ASSEMBLY

[76] Inventor: Sydney L. Terry, 47 Pine Ct., Grosse Pte. Farms, Mich. 48236

[21] Appl. No.: 606,586

[22] Filed: Oct. 31, 1990

Related U.S. Application Data

[63] Continuation-in-part of Ser. No. 495,618, Mar. 19, 1990, Pat. No. 5,011,351.

[51] Int. Cl.⁵ .................. F16B 35/04; F16B 37/04; B23P 11/02
[52] U.S. Cl. .................. 411/144; 411/134; 411/149; 29/525.1
[58] Field of Search .................. 411/129-135, 411/144, 149, 145, 155, 156, 161, 162, 957; 29/525.1

[56] References Cited

U.S. PATENT DOCUMENTS

| | | | |
|---|---|---|---|
| 553,780 | 1/1896 | Dickason | 411/149 |
| 2,271,732 | 2/1942 | Chappurs . | |
| 3,077,218 | 2/1963 | Ziegler . | |
| 3,221,792 | 11/1990 | Poupitch . | |
| 3,417,802 | 12/1968 | Oldenkott . | |
| 4,538,313 | 9/1985 | Frieberg | 411/149 |
| 4,704,058 | 11/1987 | Crunwell | 411/134 |
| 4,708,555 | 11/1987 | Terry . | |
| 4,793,752 | 12/1988 | Frieberg . | |

FOREIGN PATENT DOCUMENTS 2413760 11/1974 Fed. Rep. of Germany ...... 411/149

Primary Examiner—Neill R. Wilson
Attorney, Agent, or Firm—Krass & Young

[57] ABSTRACT

A locking fastener assembly in which coacting cam surfaces are employed to generate wedging forces in response to backing off movement of the associated nut or washer at the conclusion of the normal tightening operation, thereby urging the nut into tighter engagement with the associated bolt and at the same time removing and reversing the residual wind up in the bolt created in the normal tightening operation. Coacting locking means are provided on the confronting faces of the elements of the fastener which operate to lock up the elements following the backing off movement so as to lock in the additional tightening generated by the backing off movement. The fastener assembly may comprise a nut and a washer with the respective locking faces provided on the lower face of the nut and the upper face of the washer; may comprise the nut, an upper washer, and a lower washer with the confronting locking faces provided on the upper face of the lower washer and the lower face of the upper washer; or may comprise a bolt and a washer with the respective locking faces provided on the lower face of the head of the bolt and the upper face of the washer.

31 Claims, 6 Drawing Sheets

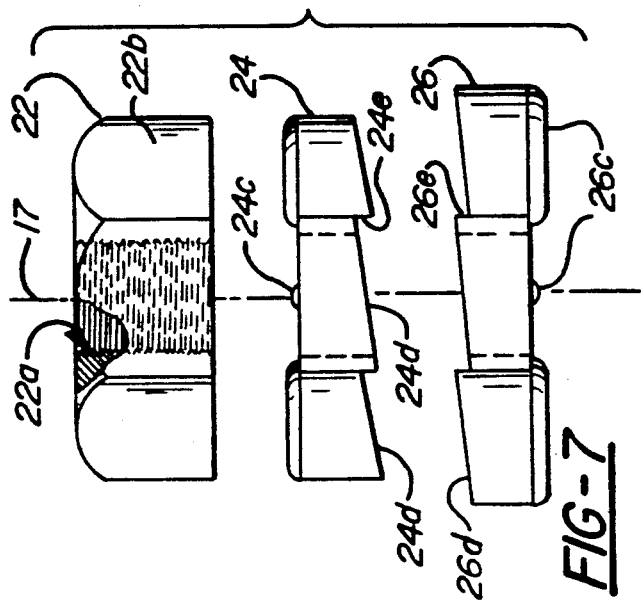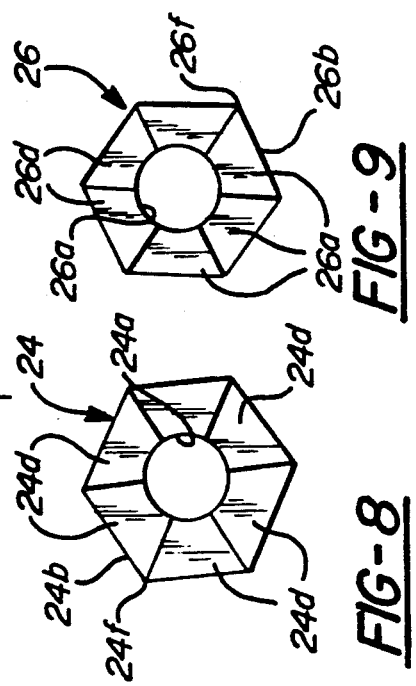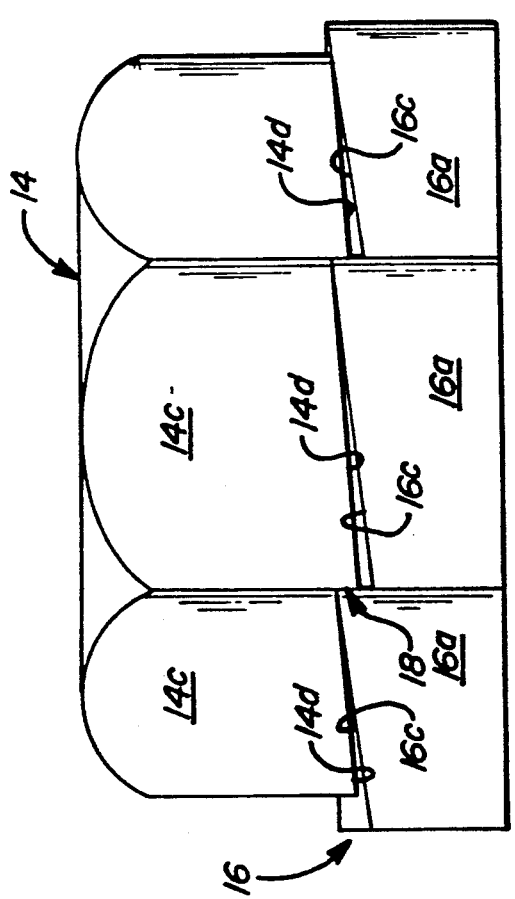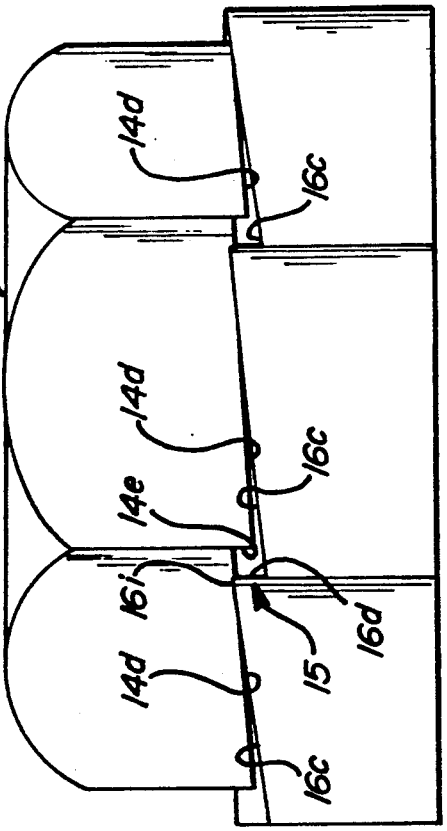

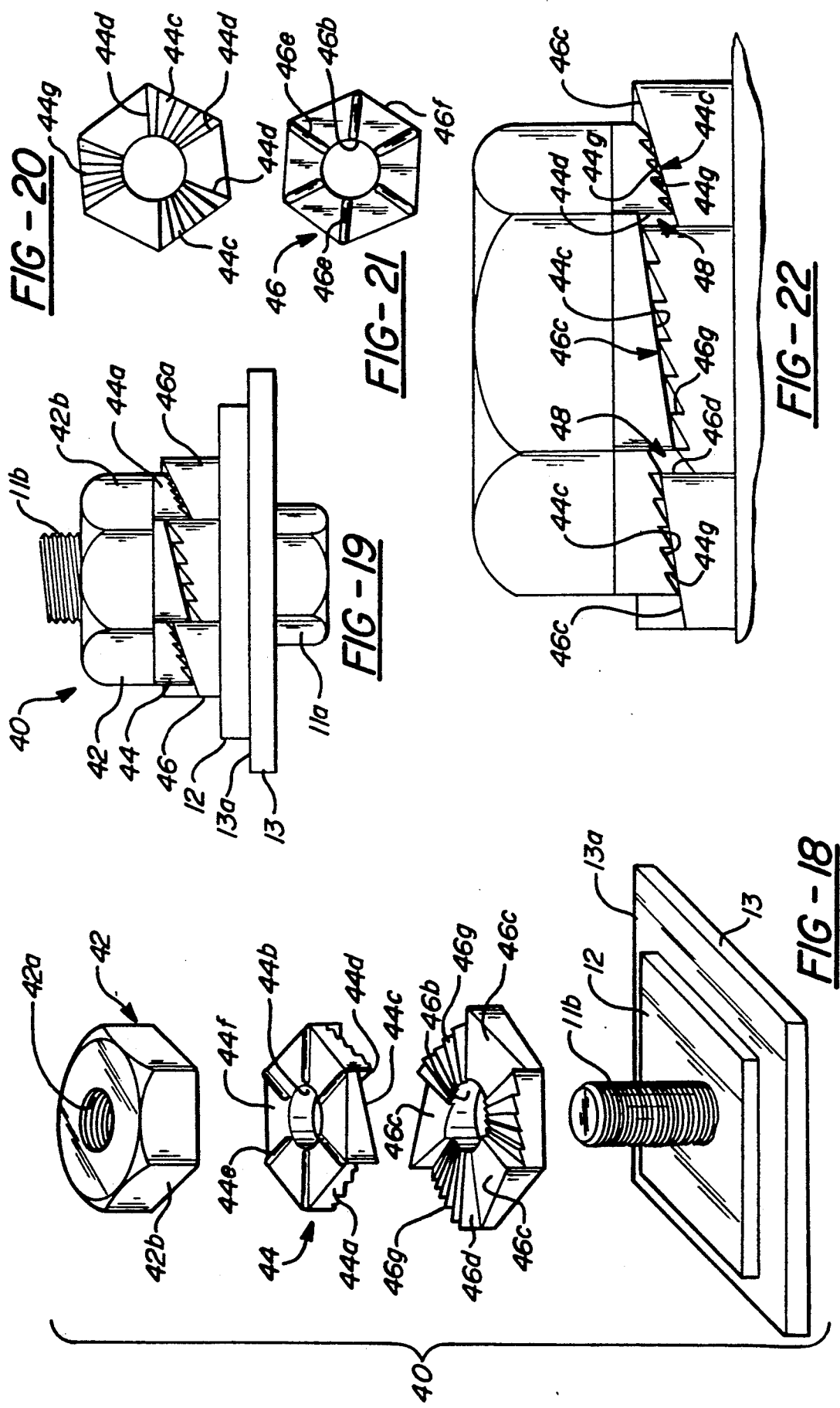

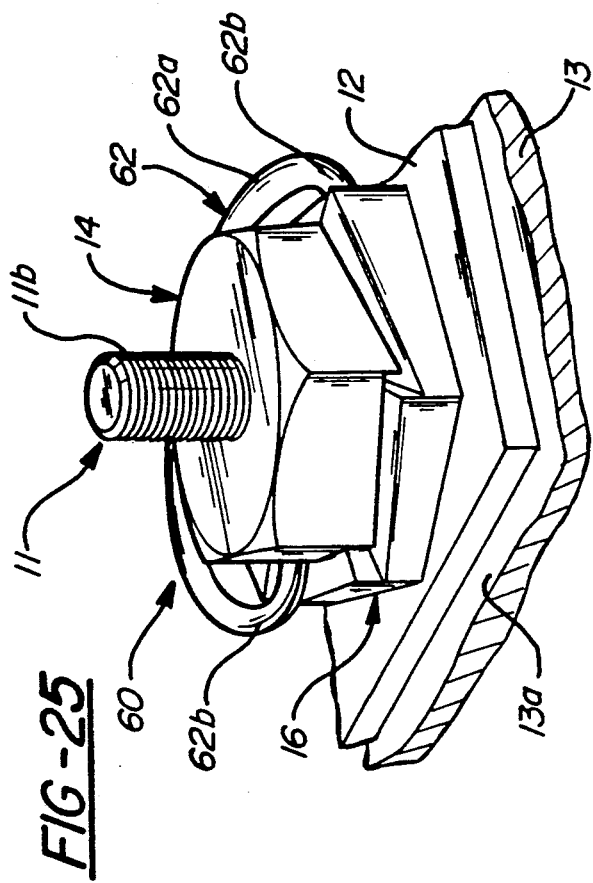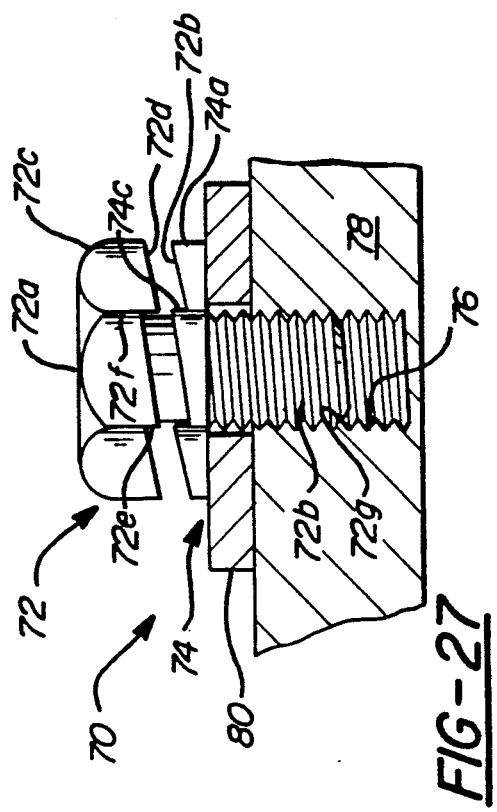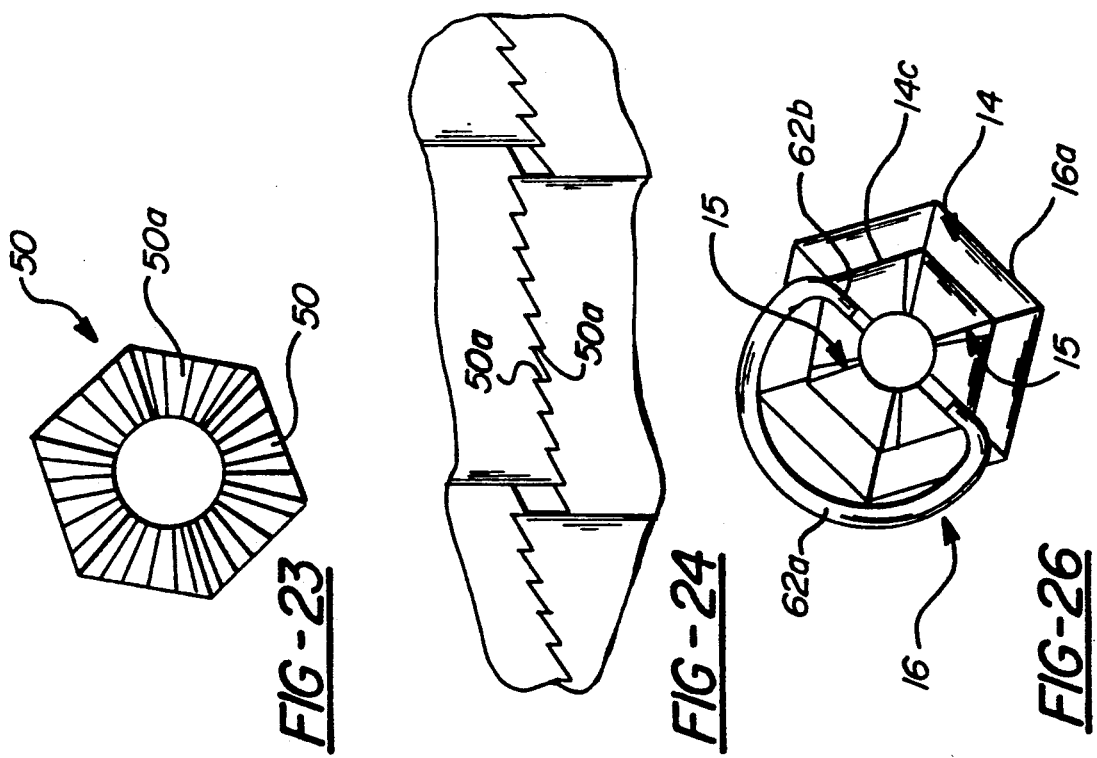

LOCKING FASTENER ASSEMBLY

RELATED APPLICATION

This application is a continuation-in-part of U.S. patent application Ser. No. 495,618 filed on Mar. 19, 1990, now U.S. Pat. No. 5,011,351.

FIELD OF THE INVENTION

This invention relates to locking fasteners and more particularly to locking fasteners of the type employing coacting wedge ramps.

BACKGROUND OF THE INVENTION

Locking fasteners have long been available in which coacting wedge ramps operate to generate wedging forces as the associated nut attempts to back off of the associated bolt and these wedging forces are arranged to urge the nut into tighter engagement with the associated bolt and workpiece. Whereas locking fasteners operating on the wedge ramp principles work very well in static demonstrations they have not achieved any wide-spread commercial acceptance since the nuts associated with the fasteners have tended to back off under the high frequency vibratory loading typically encountered in real life commercial environments.

Recent research has shown that the loosening of nuts is mainly caused by the wind-up or twist that remains in the bolt shank after tightening due to the opposing frictional torques caused by the friction in the threads opposed by the friction between the bolt head and its seat. This wind-up force is large and is constantly acting in a direction to back off the nut. For a bolt and nut tightened in the usual manner it is always present and roughly proportional to the tension load or holding force present in the bolt. It is this basic unwinding force or torque that is the major cause of the vibration loosening of threaded joints.

SUMMARY OF THE INVENTION

This invention is directed to the provision of improved locking fastener assembly which is effective to preclude loosening of the associated nut even under high frequency vibratory load conditions.

More specifically, this invention is directed to the provision of a locking fastener assembly in which the residual torque in the bolt is removed and reversed.

Yet more specifically, this invention is directed to the provision of a locking fastener assembly in which the residual torque in the bolt is removed and reversed and a positive lock is provided to maintain the elements of the assembly in a desired relative disposition following the tightening action.

This invention is further directed to the provision of a locking fastener assembly including means for visually and readily assuring that the final tightening operation has been performed.

The invention locking fastener assembly is adapted for coaction with an elongated threaded fastener. According to the invention, the locking fastener assembly includes a first annular member defining a first annular face; a second annular member defining a second annular face; and coacting means on the annular faces operative in response to relative rotation of the members in one direction with the faces in confronting relation to lockingly engage the faces in a sense to preclude retrograde relative rotation of the members in the opposite direction. This arrangement allows the annular members to be tightened down securely in a tightening operation and thereafter backed off slightly relative to each other to set the annular members relative to each other and preclude loosening of the joint.

According to a further feature of the invention, the coacting means comprise a plurality of angled circumferentially spaced first cam surfaces on the first annular face and a plurality of angled circumferentially spaced second ca surfaces on the second annular face having a lead greater than the lead of the cam surfaces on the first annular face. This lead differential allows the annular members to move into an interlocking relationship as they are backed off relative to each other following the tightening operation.

According to a further feature of the invention, the first annular member is formed of a relatively soft material, and the second annular member is formed of a relatively hard material. This material differential allows the second annular member to embed itself into the cam faces of the first annular member during the backing off operation to facilitate the interlocking action.

In one embodiment of the invention, the first member is a nut having internal threads with a lead equal to or less than the lead of the first cam surfaces; the first cam surfaces are defined on the lower face of the nut; the second member is a washer; and the second cam surfaces are defined on the upper face of the washer. This specific arrangement provides a nut and washer combination that may be tightened onto an associated threaded member and thereafter backed off slightly to securely lock the cam surfaces defined on the lower face of the nut and the upper face of the washer.

According to a further feature of this embodiment of the invention, the washer has wrenching flats on its outer periphery. With this arrangement, the washer may be held against rotation as the nut is backed off relative to the washer following the tightening operation.

According to a further feature of this embodiment of the invention, the effective diameter of the washer wrenching flats is greater than the effective diameter of the wrenching flats on the nut. This arrangement further facilitates the separate engagement of the washer during the backing off operation of the nut.

According to a further feature of this embodiment of the invention, the washer has serrations on its lower face. This arrangement facilitates the locking engagement of the lower face of the washer with the related seating surface.

In another embodiment of the invention, the first member is constituted by a first washer; the second member is constituted by a second washer; the first cam surfaces are defined on the lower face of the first washer; and the second cam surfaces are defined on the upper face of the second washer. In this arrangement, the first washer is tightened in association with a nut to move the cam surfaces on the first washer downwardly on the cam surfaces of the second washer during the tightening operation whereafter the nut and first washer are loosened relative to the second washer to accomplish the final tightening operation.

According to a further feature of this embodiment of the invention, each of the washers has wrenching flats at its outer periphery and the wrenching flats on the second washer have a greater diameter than the wrenching flats on the first washer. This arrangement allows the nut and first washer to be tightened downwardly together in the tightening operation whereafter the second washer may be separately engaged to preclude rotation of the second washer as the nut and first washer are backed off.

The invention also provides a method of providing a threaded joint that is resistant to loosening. The invention method comprises the steps of providing a first annular member having a plurality of cam surfaces separated by generally radially extending ledges; providing a second annular member having a plurality of cam surfaces separated by generally radially extending ledges; tightening the members together in a first direction to tighten the assembly with the first ledges abutting the second ledges; backing off the first member relative to the second member to move the first and second ledges out of abutting engagement and create a plurality of circumferentially spaced spaces defined between respective pairs of first and second ledges; and locking said members in their backed off positions. This methodology allows a final tightening operation with respect to the joint with the amount of final tightening being selectively controllable by the extent of backing off movement.

In one aspect of the invention methodology, the locking steps is accomplished by establishing a small lead differential as between the cam surfaces on the first annular member and the cam surfaces on the second annular member so that the members bite into each other during the backing off operation to generate the locking action. To facilitate the locking action, the first annular face may be formed of a relatively soft material and a second annular face may be formed of a relatively hard material so that the second cam surfaces are driven into the first cam surfaces as the threaded fastener member is move din a loosening direction.

In another aspect of the invention methodology, the locking step comprises providing at least one tooth on at least one cam surface of one of the members sized and configured for locking coaction with the other member in response to the backing off movement of the members.

According to a further aspect of the invention methodology the locking step is accomplished by inserting wedge means in the spaces following the backing off operation. The wedge means may comprise, for example, a snap ring including end portions which are inserted into diametrically opposed spaces created during the backing off operation.

In any of the disclosed embodiments, the invention further contemplates that some manner of adhesive or cement means may be provided to maintain the two annular members in a predetermined assembled position with the adhesive or cement yielding in response to reverse rotation of the upper annular member to allow the upper annular member to move to its backed-off, locked position relative to the lower member. The same function may be provided by some manner of mechanical means leaving the parts mechanically joined but free to rotate with respect to one another; such mechanical means are well known in the art.

BRIEF DESCRIPTION OF THE DRAWINGS

FIG. 5 is a detailed view showing the developed profile of a portion of the upper surface of the washer of the locking fastener assembly of FIG. 1 and the developed profile of a portion of the lower surface of the nut of the locking fastener assembly of FIG. 1 with the nut and washer profile shown prior to reverse rotation;

FIG. 6 is a view similar to FIG. 5 but showing the nut and washer profiles after the nut has been backed off;

FIG. 7 is an exploded view of a further embodiment of the invention locking fastener assembly;

FIG. 8 is a bottom view of a first washer employed in the assembly of FIG. 7;

FIG. 9 is a top view of a second washer employed in the assembly of FIG. 7;

FIG. 18 is an exploded view of a further embodiment of the invention locking fastener assembly;

FIG. 19 is a side elevational view of the locking fastener assembly of FIG. 18 with the elements of the assembly in their assembled relation;

FIG. 20 is a bottom view of an upper washer employed in the fastener assembly of FIG. 18;

FIG. 21 is a bottom view of a lower washer employed in the fastener assembly of FIG. 18;

FIG. 22 is a fragmentary view of the fastener assembly of FIG. 18 showing the interacting profiles of the upper and lower washers;

FIG. 23 is a view of a further annular washer member according to the invention;

FIG. 24 is a view showing a nut and ratchet profile employing annular fasteners of the type shown in FIG. 23;

FIG. 25 is a perspective view of the locking fastener assembly of FIG. 1 and further including a locking snap ring;

FIG. 26 is a diagrammatic top view of the locking fastener assembly of FIG. 25; and FIG. 27 is a view of a further embodiment of the invention locking fastener assembly.

DETAILED DESCRIPTION OF THE PREFERRED EMBODIMENTS

Figure 1:
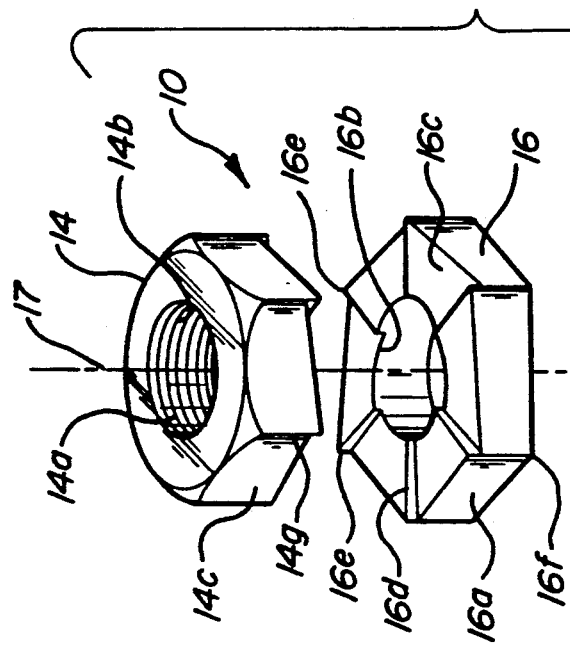
FIG. 1 is an exploded view of a first embodiment of the invention locking fastener assembly.

The invention locking fastener assembly 10 seen in FIG. 1 is adapted for coaction with an elongated threaded fastener 11 to secure an element 12 to the upper surface 13a of a foundation member 13 in a clamping manner and may as shown comprise a bolt having a head portion 11a and a shank portion 11b passing upwardly through a suitable aperture in member 13 or may alternatively comprise a stud upstanding from member 13.

Fastener assembly 10 includes a nut 14 and a washer 16.

Nut 14 includes a central aperture 14a, internal threads 14b matching the external threads of the shank portion 11b of bolt 11; external wrenching flats 14c arranged in a standard hexagonal configuration; a plurality of flat, angled, circumferentially spaced cam surfaces 14d on the lower annular face of the nut; and a plurality of radially extending edges or ledges 14e separating and delineating the cam surfaces 20d.

Each cam surface 14d has a circumferential extent of 60° and each edge or ledge 14e extends radially from the central aperture 14a of the nut to a respective corner 14g defined at the intersection of adjacent wrenching flats 14c. Each ledge 14e lies in a vertical plane generally parallel to the central axis 17 of the fastener assembly and has a uniform height throughout its radial extent. Cam surfaces 14d have a lead or inclination greater than the lead of the threads of the bolt 11. For example, for use with a bolt 11 having a thread lead of 0.0625 inches or 16 revolutions per inch, the lead of cam surfaces 14b may be 0.125 inches or 8 revolutions per inch providing a rise of 0.021 inches per cam surface and a height of 0.021 inches for each ledge 14e.

Washer 16 includes hexagonal wrenching flats 16a, a central aperture 16b, a plurality of flat angled circumferentially spaced cam surfaces 16c the upper annular face of the washer, and a plurality of radially extending edges or ledges 16d separating and delineating the cam surfaces 16c.

Each ledge 16d lies in a generally vertical plane generally parallel to the central axis 17 of the fastener assembly and extends radially with a uniform height from the central aperture 16b of the washer to a respective corner 16f defined at the intersection of adjacent wrenching flats 16a. The effective diameter of the wrenching flat 16a of the washer 16 is greater than the effective diameter of the wrenching flats 14c of the nut 14 so that the nut and washer may be separately engaged and separately rotated.

Cam surfaces 16c on the washer correspond in circumferential spacing and number to the cam surfaces 14d on the nut and ledges 16d on the washer correspond in number and circumferential spacing to the ledges 14e of the nut. However, the lead of cam surfaces 16c is greater than the lead of cam surfaces 14d. For example, the lead of cam surface 16c may be 0.143 or 7 revolutions per inch providing a rise of 0.024 inches per cam surface and a height of 0.024 inches for each ledge 16d.

Nut is preferably formed from a relatively soft ferrous material and washer 16 is preferably formed from a relatively hard ferrous material. For example, nut 14 may be formed from 1010 unhardened low carbon steel having a Rockwell C of 15-20 and washer 16 may be formed from 1050 hardened high carbon steel having a Rockwell C of 45-50.

Figure 4:
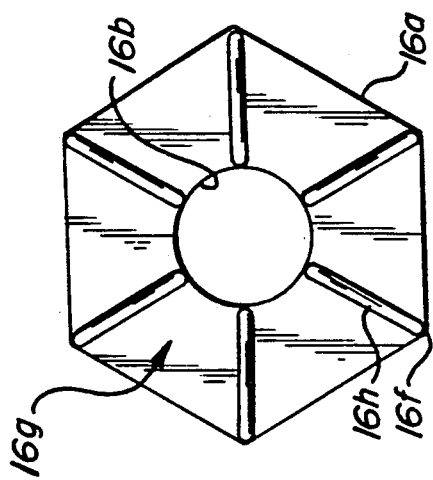
FIG. 4 is a bottom view of a washer employed in the locking fastener assembly of FIG. 1.
Figure 2:
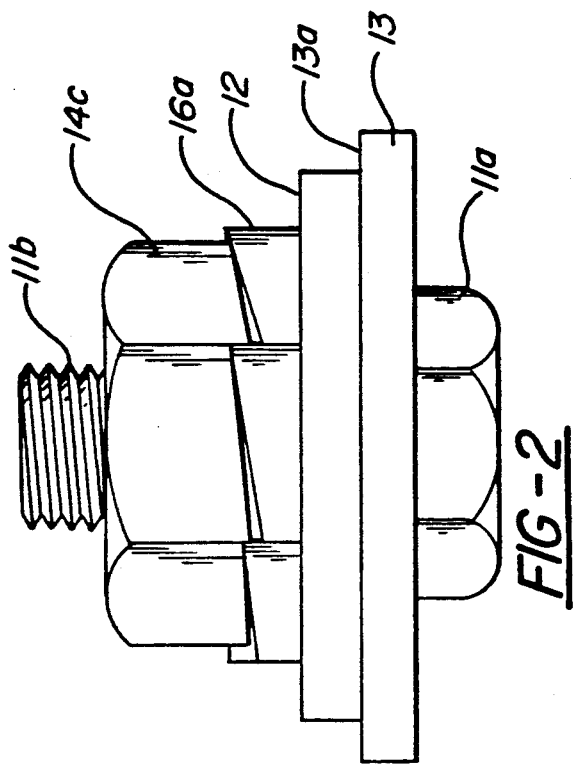
FIG. 2 is a side elevational view of the locking fastener assembly of FIG. 1 with the elements of the assembly in their assembled relation.
Figure 3:
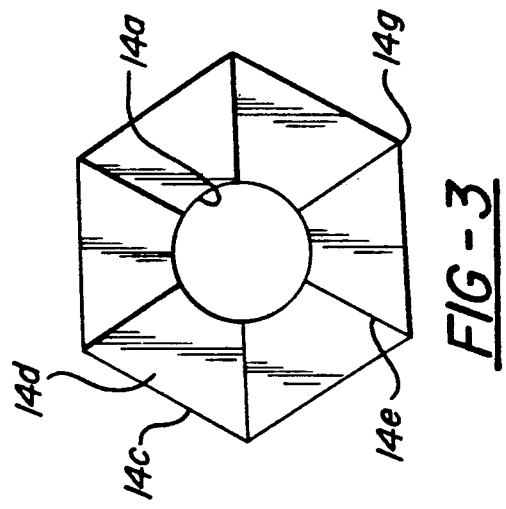
FIG. 3 is a bottom view of a nut employed in the locking fastener assembly of FIG. 1.

As seen in FIG. 4, the undersurface 16g of washer 16 is provided with a plurality of radially extending ribs or serrations 16h extending from the central aperture 16b to a corner 16f defined between the adjacent wrenching flats 16a.

Nut 14 is preferably secured to washer 16 by adhesive or cement 18 which may be positioned, for example, between adjacent ledges 14e and 16d to maintain the nut and washer, prior to use, in the juxtaposed, assembled position seen in FIG. 5 wherein ledges 14e are maintained in abutting relation to ledges 16d. Cement or adhesive 18 is such as to normally retain the nut and washer in the juxtaposed assembled position seen in FIG. 5 but to readily release in response to relative rotation of the nut and washer to break the bond.

In the use of the fastener assembly of FIG. 1, the adhesively secured nut and washer combination is positioned over the bolt 11 and the nut is threaded downwardly onto the bolt so as to clamp the part 12 to the surface 13a. As the fastener assembly is tightened down onto the part 12 to clamp the part to the surface 13a a certain amount of residual torque is created in the bolt 11 and this torque, if not released, will have a tendency to try to urge the nut and/or washer in a loosening direction.

According to the invention, after the nut and washer combination have been tightened onto the top of the member 12, the washer 16 is held stationary by a suitable wrench engaging wrenching flats 16a and the nut is backed off a small amount, by the use of a wrench engaging wrenching flats 14c, to relieve the residual torque in the bolt. The nut is preferably backed off by approximately 5° to allow the bond provided by the cement 18 to be broken and to allow the ledges 14e of the nut to move into a spaced relation relative to the ledges 16d of the washer.

As the nut is backed off relative to the washer the cam surfaces 14d of the nut move upwardly along an inclined plane or lead dictated by the coacting threads or lead of the nut and bolt so that the nut is effectively drawn downwardly relative to the washer as the nut is rotated relative to the washer with the effect that the sharp hard radial edges 16i defined at the intersections of cam surfaces 16c and ledges 16d are driven into and embedded in the soft material of the confronting cam surfaces 14d of the nut (as seen in FIG. 6) so that once the reverse rotation has been terminated, retrograde movement of the nut relative to the washer in response to vibratory loading encountered during usage is effectively precluded by the biting engagement of the hard edges 16i in the soft surfaces of the nut cam surfaces 14d.

The actual extent of relative movement between the nut and washer is calculated so as to be sufficient to not only eliminate the residual wind up or torque in the bolt but to pass beyond the point of zero wind-up and create reverse wind-up in the bolt tending to tighten the assembly. Accordingly, reverse wind-up is locked in by the embedding of the edge 16i in the soft material of the cam surfaces 14d so that the nut is precluded from moving in the direction that is being urged by the residual or the reverse torque in the bolt by virtue of the locking engagement of the edges 16i with the surfaces 14d. The invention fastener assembly is thus extremely resistant to loosening even under extreme vibratory conditions.

As previously indicated, only a small amount of reverse rotation is required to remove the residual stress from the bolt. For example, in most applications, 5° of reverse rotation is sufficient to not only eliminate the residual wind up in the bolt but to create a small amount of reverse wind up in the bolt which acts to create rotational forces which are effectively counteracted by the locking engagement of the teeth 16i with the surfaces 14d.

It will be understood that as the nut is loosened or backed off relative to the washer following the initial tightening operation, the axial tension loading in the bolt is increased by virtue of the lead of the cam surfaces exceeding the lead of the threads of the bolt. The backing off operation also has the effect of driving the serrations or ribs 16h on the underface 16g of the washer downwardly into the upper face of the member 12 so as to further tighten the assembly and preclude unwanted relative rotation of the washer on the part 12. The backing off operation also creates a significant gap or spacing 15 between adjacent ledges 14e and 16d which can be readily discerned by the user, or by a separate inspector, to ensure that the final backing off or tightening operation has been performed.

When it is desired to remove the locking fastener 10 from the bolt 11, a wrench is applied to the wrenching flats 16a of washer 16 and the washer and thereby the nut are turned in a loosening direction to remove the fastener assembly from the bolt.

In the invention embodiment seen in FIGS. 7-10, the invention fastener assembly 20 includes a nut 22, an upper washer 24, and a lower washer 26.

Nut 22 includes central aperture 22a including internal threads matching the external threads of the shank portion 11b of a bolt 11 with which the nut is to be threadably engaged in known manner, and external wrenching flats 22b arranged in a standard hexagonal configuration.

Upper washer 24 includes a central aperture 24a, hexagonal wrenching flats 24b having an effective diameter matching the diameter of the wrenching flats 22b of the nut 22; a plurality of circumferentially spaced radially extending ribs 24c on the upper face of the washer; a plurality of flat angled circumferentially spaced cam surfaces 24d on the lower annular face of the washer; and a plurality of radially extending edges or ledges 24e separating and delineating the cam surfaces 24d. Each ledge 24e lies in a vertical plane generally parallel to the central axis 17 of the washer assembly and extends radially with a uniform height from the central aperture 24a of the washer to a respective corner 24f defined at the intersection of adjacent wrenching flats 24b.

Cam surfaces 24d have a lead or inclination equal or greater than the leads of the threads of the bolt 11 and nut 22. For example, for use with a bolt 11 and nut 22 having a thread lead of 0.0625 inches or 16b revolutions per inch, the lead of cam surfaces 24d may be 0.125 inches or 8 revolutions per inch providing a rise of 0.021 inches per cam surface and a height of 0.021 inches for each ledge 24e.

Lower washer 26 includes a central aperture 26a; hexagonal wrenching flats 26b having an effective diameter significantly greater than the effective diameter of the wrenching flats 22b and 24b on the nut 22 and upper washer 24 so that the lower washer may be separately engaged and separately rotated; a plurality of circumferentially spaced radial ribs 26c on the lower face of the washer; a plurality of flat angled circumferentially spaced cam surfaces 26d on the annular upper face of the washer; and a plurality of radially extending ledges 26e separating and delineating the cam surfaces 26d.

Each ledge 26e lies in a vertical plane generally parallel to the central axis 17 of the fastener assembly and extends radially with a uniform height from the central aperture 26a of the washer to a respective corner 26f defined at the intersection of adjacent wrenching flats 26b.

Cam surfaces 26d in the upper face of washer 26 correspond in circumferential spacing and number to the cam surfaces 24d on the lower face of upper washer 24 and ledges 26e on the lower washer correspond in number and circumferential spacing to the ledges 24e on the upper washer. However, the lead of cam surfaces 26d is greater than the lead of the threads of nut 22 and bolt 11 but less than the lead of cam surfaces 24d. For example, the lead of cam surfaces 26d may be 0.114 or 9 revolutions per inch providing a rise of 0.019 inches per cam surface and a height of 0.019 inches for each ledge 26e.

Nut 22 is preferably formed, in accordance with standard practice, from a relatively soft ferrous material; washer 24 is preferably formed from a relatively hard ferrous material; and lower washer 26 is preferably formed from a ferrous material having a hardness intermediate the hardnesses of nut 22 and upper washer 24. For example, nut 14 may be formed from 1010 unhardened low carbon steel having a Rockwell C of 15-20; washer 24 may be formed from 1050 hardened high carbon steel having a Rockwell C of 45-50; and washer 26 may be formed from 1030 hardened medium carbon steel having a Rockwell C of 25-30.

Upper washer 24 is preferably secured to lower washer 26 by adhesive or cement 28 which may be positioned, for example, between adjacent ledges 26e and 24e to maintain the washers, prior to use, in a juxtaposed assembled position wherein ledges 24e are maintained in abutting relation to ledges 26e. Cement or adhesive 28 is such as to normally retain the washers in the juxtaposed assembled position but to readily release in response to relative rotation of the upper and lower washers to break the bond.

In the use of the fastener assembly of FIGS. 7-10, the adhesively secured washer combination is positioned over the bolt 11 and the nut is threaded downwardly onto the bolt so as to clamp the part 12 to the surface 13a. As to fastener assembly is tightened onto the part 12 to clamp the part 12 to the surface 13a, radial ribs 24c on the upper face of upper washer 24 dig into the lower face of the nut to provide a secure frictional engagement as between the nut and the upper washer and ribs 26c on the lower face of the lower washer dig into the surface 13a so as to provide a secure frictional engagement as between the lower washer and the surface 13a. Further, as the fastener assembly is tightened down onto the part 12, a certain amount of residual torque is created in the bolt 11 and this torque, if not released, will have a tendency to try to urge the fastener assembly in a loosening direction.

According to the invention, after the nut and washer assembly have been tightened onto the top of the member 12, the lower washer 26 is held stationary by a suitable wrench engaging wrenching flats 26b and the nut and upper washer are backed off a small amount, by the use of a wrench engaging wrenching flats 22b and 24b, to relieve the residual torque in the bolt. The nut and upper washer are preferably backed off by approximately 5° to allow the bond provided by the cement 28 to be broken and to allow the ledges 24e of the upper washer to move into a spaced relation relative to the ledges 26e of the lower washer. As washer 26, the cam surfaces 24d of the upper washer move upwardly along an inclined plane or lead defined by the coacting threads or lead of the nut and bolt so that the upper washer is effectively drawn downwardly relative to the lower washer as the nut and upper washer are rotated relative to the lower washer with the effect that the sharp hard radial edges 24g defined by the intersections of cam surfaces 24d and ledges 24e are driven into and embedded in the soft material of the confronting cam surfaces 26d of the lower washer (as seen by the phantom or dotted lines of FIG. 11) so that once the reverse rotation has been terminated, retrograde movement of the upper washer and nut relative to the lower washer in response to vibratory loading encountered during usage is effectively precluded by the biting, locking engagement of the hard edges 24g in the soft surfaces of the lower washer cam surfaces 26d.

After tightening in the conventional manner, any actual relative movement between the upper washer and nut and the lower washer is sufficient to not only eliminate the residual windup or torque in the bolt, but to pass beyond the point of zero windup and create a reverse windup in the bolt tending to tighten the assembly. Accordingly, reverse windup is locked in by the embedding of the edges 24g in the soft material of the cam surfaces 26d so that the nut and upper washer are precluded from moving in the direction that is being urged by the residual or reverse torque in the bolt by virtue of the locking engagement of the edges 24g with the surfaces 26d. The fastener assembly of FIGS. 7–10 is thus extremely resistant to loosening even under extreme vibratory conditions.

It will be understood that as the nut and upper washer are loosened relative to the lower washer following the initial tightening operation, the axial tension loading in the bolt is increased by virtue of the lead of the cam surfaces exceeding the lead of the threads of the bolt. The backing off operation also has the effect of driving the ribs 24c on the upper face of upper washer 24 upwardly into the lower face of the nut and driving the ribs 26c on the lower face of the lower washer 26 into the upper face of member 12 so as to further tighten the assembly and preclude unwanted relative rotation of the components of the assembly. The backing off operation also creates a significant gap or spacing between adjacent ledges 24e and 26e which can be readily discerned by the user, or by a separate inspector, to ensure that the final backing off or tightening operation has been performed.

When it is desired to remove the fastener assembly 20 from the bolt 11, a wrench is applied to the wrenching flats of the lower washer 26 and the lower washer and thereby the upper washer and nut are turned in a loosening direction to remove the fastener assembly from the bolt.

In the embodiment of the invention fastener assembly seen in FIGS. 11–17, the assembly 29 includes a nut 30 and a washer 32.

Nut 30 includes a central aperture 30a; internal threads 30b matching the external threads of the shank portion 11b of bolt 11; external wrenching flats 30c arranged in a standard hexagonal configuration; a plurality of flat, angled, circumferentially spaced cam surfaces 30d on the lower annular face of the nut; a plurality of radially extending edges or ledges 30e separating and delineating the cam surfaces 30d; and a radially extending ratchet tooth or edge 30f on each cam surface 30d.

Each cam surface 30d has a circumferential extent of 60° and each ledge 30e extends radially from the central aperture 30a of the nut to a respective corner 30g defined at the intersection of adjacent wrenching flats 30c. Each ledge 30e lies in a vertical plane generally parallel to the central axis 17 of the fastener assembly, has a uniform height throughout its radial extent, and coacts with one cam surface 30d to define a root 30h and with the next adjacent cam surface 30d to define a crest 30i.

Each tooth 30f is provided on the respective cam surface 30d at a location proximate the root 30h defined by the adjacent ledge 30e and, for example, may be located 5° circumferentially from the radial location of the adjacent ledge 30e. Cam surfaces 30d have a lead or inclination greater than the lead of the threads of the bolt 11. For example, for use with a bolt 11 having a thread lead of 0.0625 inches or 16 revolutions per inch, the cam surface lead may be 0.125 inches or eight revolutions per inch providing a rise of 0.021 inches per cam surface and a height of 0.021 inches for each ledge 30e.

Ratchet teeth 30f, by contrast, have a greater lead than the basic cam surface 30d and may, for example, have a 0.25 inch lead providing a rise of approximately 0.0035 inches per 5° of rotation. Given these dimensions, the height or drop provided by the tooth 30f may be 0.0015 inches providing a lead of 0.002 inches from the root or bottom of a ledge 30d to the root or bottom of an adjacent tooth 30f. Each tooth 30f is of uniform height from the central aperture 30a to the outer perimeter of the nut.

Washer 32 includes hexagonal wrenching flats 32a; a central aperture 32b; a plurality of flat, angled, circumferentially spaced cam surfaces 32c on the annular upper face of the washer; a plurality of radially extending edges or ledges 32d separating and delineating the cam surfaces 32c; and a radially extending ratchet tooth or edge 32e on each cam surface 32c.

Each ledge 32d lies in a vertical plane generally parallel to the central axis 17 of the fastener assembly and extends radially with a uniform height from the central aperture 32b of the washer to a respective corner 32f defined at the intersection of adjacent wrenching flats 32a. The effective diameter of the wrenching fats 32a of the washer 32 is greater than the effective diameter of the wrenching flats 30c of the nut 30 so that the nut and washer may be separately engaged and separately rotated.

Cam surfaces 32c on the washer correspond in lead, circumferentially spacing, and number to the cam surfaces 20d on the nut and ledges 32d on the washer correspond in number and circumferential spacing to the ledges 30e of the nut. Each tooth 32e is provided on each cam surface 32c proximate the root 32g of the adjacent ledge 32d. Each ratchet tooth 32e extends with a uniform height from the external periphery of the washer to the central aperture 32b and is parallel to the adjacent ledge 32d. As with the nut 20, the lead of each cam surface 32c may be 0.125 inches, or eight revolutions per inch, providing a rise of 0.021 inches per cam surface and each ratchet tooth may be a circumferential extent of 50° and a lead of approximately 0.250 inches providing a rise of approximately 0.0035 inches per 5° of rotation with a drop off of 0.0015 inches at the tooth 32e giving a net rise from the root of a ledge 32d to the root of an adjacent ratchet tooth 32e of 0.002 inches.

Figures 13, 14:
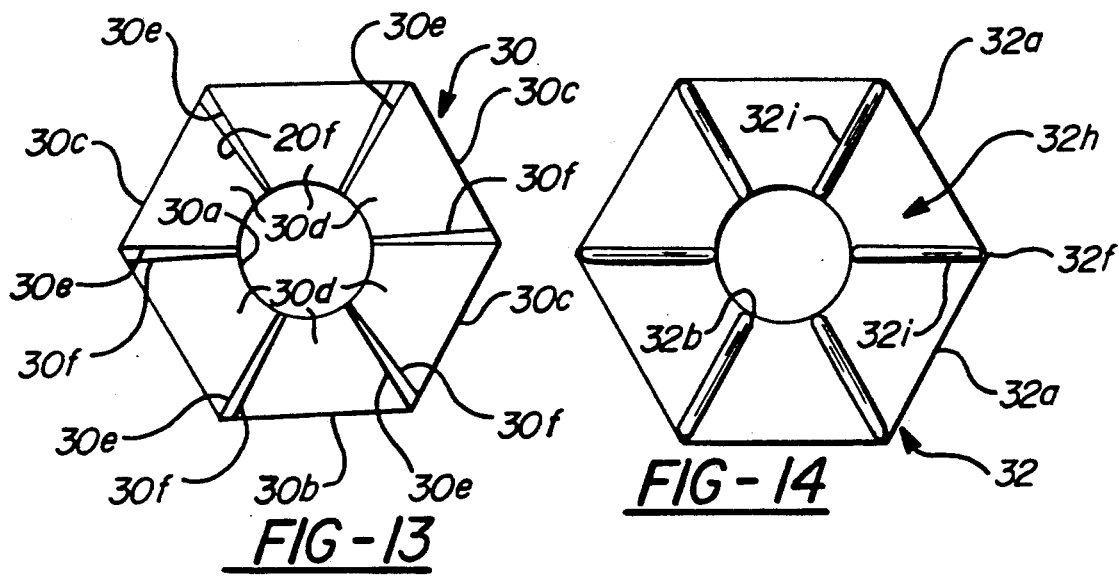
FIG. 13 is a bottom view of a nut employed in the locking fastener assembly of FIG. 11.
FIG. 14 is a bottom view of a washer employed in the locking fastener assembly of FIG. 11.
Figure 15:
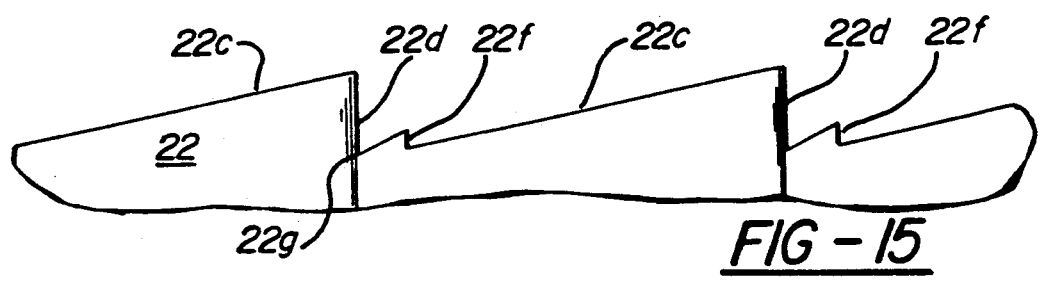
FIG. 15 is a developed profile of a portion of the upper surface of the washer of the locking fastener assembly of FIG. 11.

As seen in FIG. 14, the undersurface 32h of the washer 32 is provided with a plurality of radially extending ribs or serrations 32i extending from the central aperture 32b to a corner 32f defined between adjacent wrenching flats 32a.

Figure 16:
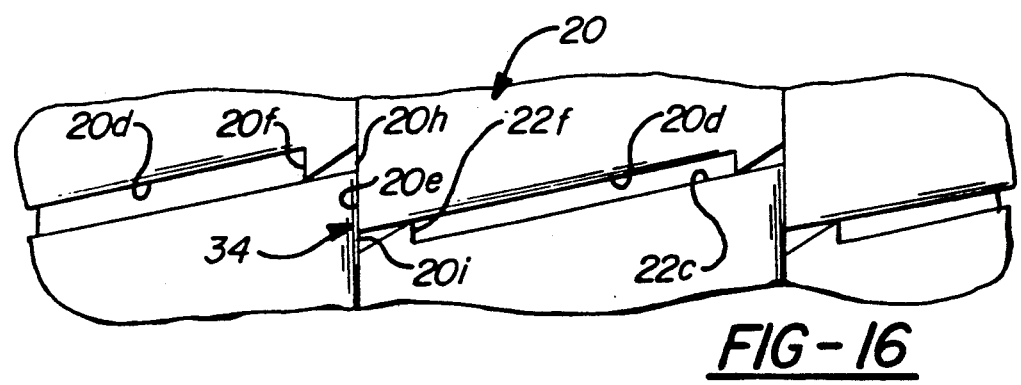
FIG. 16 is a view similar to FIG. 15 but also showing a developed profile of a portion of the lower surface of the nut of the locking fastener assembly of FIG. 11 with the nut and washer profile shown prior to reverse rotation to engage the teeth.
Figure 17:
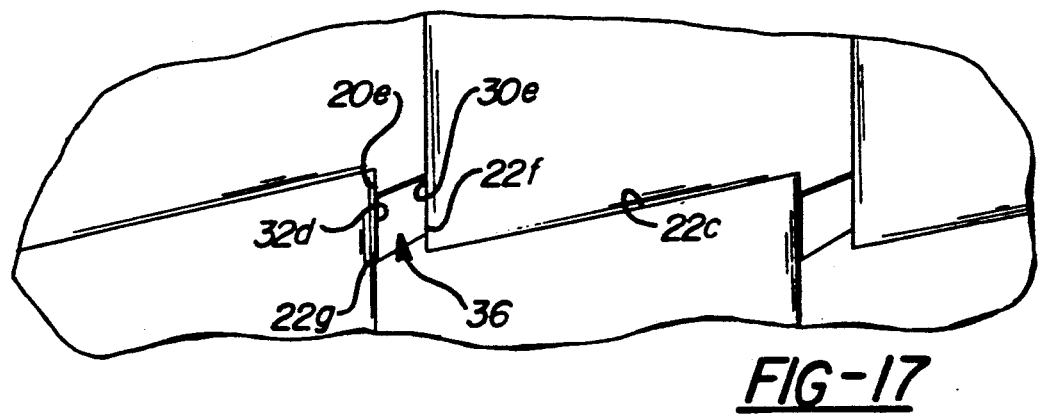
FIG. 17 is a view similar to FIG. 16 but showing the nut and wash profiles after the nut has been backed off.

Nut 30 is preferably secured to washer 32 by adhesive or cement 34 which may be positioned, for example, between adjacent ledges 30e and 32d to maintain the nut and washer, prior to use, in the juxtaposed, assembled position seen in FIG. 16 wherein ledges 30e are maintained in abutting relation to ledges 32d. Cement or adhesive 34 is such as to normally retain the nut and washer in the juxtaposed assembled position seen in FIG. 16 but to readily release in response to relative rotation of the nut and washer to break the bond.

Figure 11:
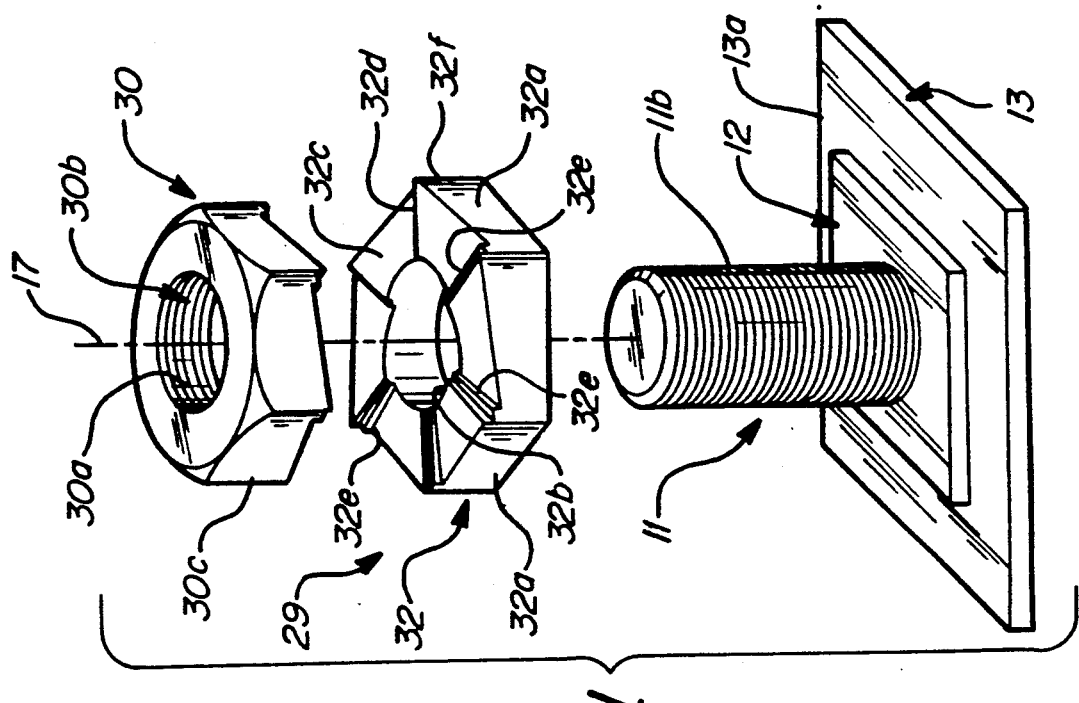
FIG. 11 is an exploded view of a further embodiment of the invention locking fastener assembly.
Figure 10:
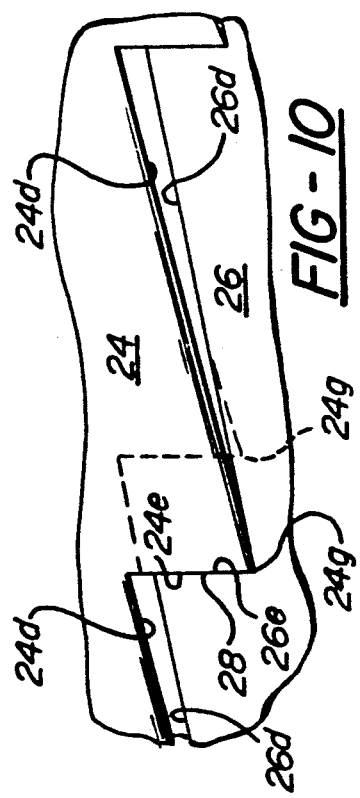
FIG. 10 is a schematic view showing the locking operation of the fastener assembly of FIG. 7.
Figure 12:
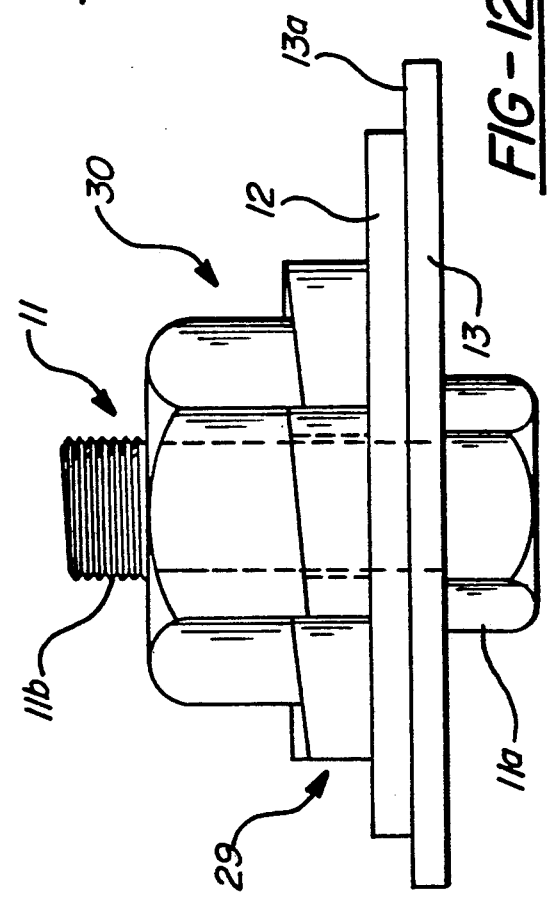
FIG. 12 is a side elevational view of the locking fastener assembly of FIG. 11 with the elements of the assembly in their assembled relation.

In the use of the fastener assembly of FIG. 11, the adhesively secured nut and washer combination is positioned over the bolt 11 and the nut is threaded downwardly onto the bolt so as to clamp the part 12 to the surface 13a. As the fastener assembly is tightened down onto the part 12 to clamp the part 12 to the surface 13a a certain amount of residual torque is create din the bolt 11 and this torque, if not released, will have a tendency to try to urge the nut and/or washer in a loosening direction.

After the nut and washer combination have been tightened onto the top of the member 13, the washer 32 is held stationary by a suitable wrench engaging wrenching flats 32a and the nut is backed off a small amount, by the use of a wrench engaging wrenching flats 30c, to relieve the residual torque in the bolt. The nut is preferably backed off by approximately 5° to allow the ledges 30e of the nut to lockingly engage with the respective ratchet teeth 32f of the washer and to allow the ledges 32d of the washer to lockingly engage with the respective ratchet teeth 30e of the nut. The actual placement of the ratchet teeth relative to the ledges is such as to provide an amount of relative movement between the nut and the washer sufficient to not only eliminate the residual wind up or torque in the bolt but to pass beyond the point of zero wind up and create reverse wind up in the bolt tending to tighten the assembly, which reverse wind up is locked-in by the coaction of the ledges and the ratchet teeth so that the nut is precluded from moving in the direction that it is being urged by the residual or reverse torque in the bolt by virtue of the locking engagement of the ledges and ratchet teeth. The invention fastener assembly is thus extremely resistant to loosening even under extreme vibratory conditions.

Only a small amount of reverse rotation is required to remove the residual stress from the bolt and, in the example given, 5° of reverse rotation is sufficient to not only eliminate the residual wind up in the bolt but to create reverse wind up in the bolt which acts to create rotational forces which are effectively counteracted by the locking engagement of the ratchet teeth and ledges.

As the nut is loosened relative to the washer following the initial tightening operation, the axial tension loading in the bolt is increased by virtue of the lead of the cam surfaces exceeding the lead of the thread of the bolt. It is, of course, necessary to consider the height or drop off of the ratchet teeth when determining the net lead provided by the cam surfaces and accordingly the parts must be designed such that the lead between the root of a ledge and the root of the adjacent ratchet tooth is still equal to or greater than the lead of the bolt threads so that, despite the dropping off of the nut relative to the washer as the ledges move past and drop into engagement with the ratchet teeth, the nut is still moved upwardly relative to the washer by an amount greater than the lead of the thread of the bolt so that the tension in the bolt is maintained or increased. The backing off operation also has the effect of driving the serrations or ridges 32i on the under face 32h of the washer downwardly into the upper face of the member 12 so as to further tighten the assembly and preclude unwanted relative rotation of the washer on the part 12. The backing off operation also creates a significant gap or spacing 36 between adjacent ledges 30e,32d which can be readily discerned by the user, or by a separate inspector, to ensure that the final backing off or tightening operation has been performed.

When it is desired to remove the locking fastener 29 from the bolt 11, a wrench is applied to the wrenching flats 32a washer 32 and the washer and thereby the nut are turned in a loosening direction to remove the fastener assembly from the bolt.

In the embodiment of the invention fastener assembly seen in FIGS. 18 through 22, the assembly 40 includes a nut 42, an upper washer 44, and a lower washer 46. Nut 42 is of standard form the includes the usual internal threads 42a and the usual hexagonal wrenching flats 42b.

Upper washer 44 includes a plurality of wrenching flats 44a having an effective diameter corresponding to the effective diameter of the wrenching flats 42b of the nut 42; a central aperture 44b; a plurality of flat, angled circumferentially spaced cam surfaces 44c on the lower face of the washer; a plurality of radially extending edges or ledges 44d separating and delineating cam surfaces 44c; and a plurality of radial serrations or ridges 44e on the upper face 44f of the washer. A plurality of circumferentially spaced radially extending ratchet teeth or edges 44g are provided across the entire circumferential extent of every second cam surface 44c. For example, twelve ratchet teeth may be provided on every second cam surface 44c with each ratchet tooth spaced 5° from the adjacent tooth and having a lead such as to provide a net rise between the roots or crests of adjacent teeth of 0.0025 inches to provide a total rise of 0.030 inches across a total cam surface 44c.

Lower washer 46 includes wrenching flats 46a; a central aperture 46b; a plurality of flat, angled circumferentially spaced cam surfaces 46d on the upper face of the washer; a plurality of radial edges or ledges 46d separating and delineating cam surfaces 46c; and a plurality of radially extending serrations 46e on the lower face 46f of the washer.

Every second cam surface 46c is provided with a plurality of ratchet teeth or edges 46g and, as with the upper washer 44, twelve ratchet teeth may be provided at equally spaced locations across each cam surface 46c so that each ratchet tooth is spaced 5° from the adjacent tooth. Also, as with the upper washer 44, each ratchet tooth may have a lead such as to provide a net rise between the roots or crests of adjacent teeth of 0.0025 inches to provide a total rise of 0.030 inches across a total cam surface 46c. In any event, the number and spacing of the cam surfaces 46c and ratchet teeth 46g on the upper face of the lower washer 46 must correspond in lead, circumferential spacing, and number to the cam surfaces 44c and ratchet teeth 44g on the upper washer 44. As with previous embodiments, washers 44 and 46 are preferably held together by a suitable cement or adhesive prior to use with ledges 46d held in abutting engagement with ledges 44d and with a toothed or ratcheted surface 44c of upper washer 44 overlying a plane unratcheted surface 46c of lower washer 46 and vice versa.

In use, the secured together washers are positioned over the shank 11b of the bolt 11 to sit on top of the member 12 to be secured whereafter the nut 42 is threaded downwardly onto the shank of the bolt until the entire assembly is tightened to firmly clamp the part 12 between the lower washer 46 and the upper face 13a of the foundation member 13. Following this initial tightening operation, the wrenching flats 46a of the lower washer 46 ar suitably engaged to preclude rotation of the lower washer and the nut and upper washer are suitably engaged by a wrench engaging their common aligned wrenching flats and the nut and upper washer are reverse rotated relative to the lower washer by an amount to relieve the residual torque in the bolt and increase the axial tension in the bolt. As the nut and upper washer arc reverse rotated relative to the stationary lower washer, the ratchet teeth 44g of the upper washer move in a ratcheting manner past the crest of the ledges 46d of the lower washer and the ratchet teeth 46g of the lower washer move in a ratcheting fashion past the crest of the ledges 44d of the upper washer. After a desired amount of relative rotation has been achieved such, for example, as would be required to remove the residual torque in the bolt and create a small amount of reverse torque in the bolt, reverse rotation of the lower washer and nut is terminated and the nut and washer are locked in this position by locking engagement of the appropriate teeth 44g,46g with the appropriate ledges 44d,46d.

For example, as seen in FIG. 22, 5° of relative rotation is sufficient to remove the residual torque in the bolt and create reverse torque in the bolt so that the first ratchet teeth as measured from the root of the adjacent ledges are lockingly engaged by the respective ledges. The overall, or net lead provided by the cam surfaces 44c,46c is greater than the lead of the thread of the bolt 11 so that reverse rotation of the upper washer and nut relative to the lower washer has the effect of increasing the axial tension loading in the bolt and has the further effect of driving the serrations 46e on the lower face of the lower washer downwardly into the upper face of the part 14 and driving the serrations 44e on the upper face of the upper washer 44 into the lower face of the nut 42 so as to further firmly lock the various elements of the fastener assembly together and lock them relative to the part 14. As with the previous embodiments, the reverse rotation operation also has the effect of opening up a significant gap 48 between adjacent ledges 44d,46d so as to provide a ready, visual inspection means to ensure that the final tightening operation has been performed.

The assembly may be removed from shank 11b by a wrench applied to the wrenching flats 46a of lower washer 46.

As depicted by the annular member 50 seen in FIG. 23, the nut and washer of the FIGS. 11-17 embodiment, or the upper and lower washers of the FIGS. 18-22 embodiment, may be provided with ratchet teeth or edges 50a spaced circumferentially around the entire face of the nut or washer at 5° intervals so that each cam surface has twelve ratchet teeth formed circumferentially thereacross. The coacting relationship of the ratchet teeth of such an arrangement is seen in FIG. 24.

The locking fastener assembly 60 seen in FIGS. 25 and 26 is identical to the locking fastener assembly 10 of FIG. 1 with the exception that the assembly further includes a locking snap ring 62 formed of a suitable spring steel material. Snap ring 62 has a generally C configuration and includes an arcuate main body portion 62a and generally radially inwardly extending end portions 62b sized to fit into the spaces 15 created between adjacent ledges 14e and 16d as nut 14 is backed off in the manner previously described relative to washer 16 in the final tightening operation.

Specifically, after nut 14 has been backed off by, for example, five degrees to create the spaces 15 between respective ledges 14e and 16d, the end portions 16b of snap ring 62 are pried apart and the end portions are snapped into diametrically opposed spaces 15. The end portions 62b, inserted into the spaces 15, act in conjunction with the biting engagement of the hard edges 16i in the soft surfaces of the nut cam surfaces to positively preclude retrograde relative movement between the nut and the washer.

Alternatively, the pitch differential as between the cam surfaces of the nut and the cam surfaces of the washer may be eliminated so that retrograde movement of the nut relative to the washer following the final tightening operation is precluded substantially solely by the snap ring end portions 62b.

The snap ring 62 of FIGS. 25 and 26 may of course be used in a similar manner with respect to the locking fastener assemblies of the FIGS. 7-10, 11-17 and 18-22 embodiments with the end portions 62b of the snap ring in each case being inserted into diametrically opposed spaces created between adjacent ledges by the final backing off operation.

The locking fastener assembly 70 seen in FIG. 27 embodies the invention fastener in a cap screw assembly. Cap screw assembly 70 includes a cap screw 72 formed of a relatively hard ferrous material and a hexagonal washer 74 formed of a relatively ferrous material.

Cap screw 72 includes a hexagonal head portion 72a and a threaded shaft portion 72b for threaded coaction, for example, with a blind tapped bore 76 in a member 78 to clamp a member 80 to the member 78. Head 72a is similar in construction to the nut 14 of the FIGS. 1-7 embodiment and includes external wrenching flats 72c; a plurality of flat angled circumferentially spaced cam surfaces 72d on the lower annular face of the head portion; and a plurality of radially extending edges or ledges 72e separating and delineating the cam surfaces 72d. Each cam surface 72d has a circumferential extent of 60 degrees and each edge or ledge 72e extends radially from the center of the head portion to a respective corner 72f defined at the intersection of adjacent wrenching flats 72c. Each ledge 72e lies in a vertical plane generally parallel to the central axis of the bolt and has a uniform height throughout its radial extent. Cam surfaces 72d have a lead or inclination greater than the lead of the threads 72g of the shank portion 72b of the cap screw.

Washer 74 is similar to the washer 16 of the FIGS. 1-17 embodiment and includes a central aperture, hexagonal wrenching flats 74a, a plurality of flat angled circumferentially spaced cam surfaces 74b on the upper annular face of the washer, and a plurality of radially extending edges or ledges 74c separating and delineating the cam surfaces 74b. Each ledge 74c lies in a vertical plane generally parallel to the central axis of the fastener assembly and extends radially with a uniform height from the central aperture of the washer to a respective corner 74d defined at the intersection of adjacent wrenching flats 74a.

Cam surfaces 74b on the washer 74 correspond in circumferential spacing and number to the cam surfaces 72d on the head portion of the cap screw and ledges 74c on the washer correspond in number and circumferential spacing to the ledges 72e on the head portion of the cap screw. The lead of the cam surfaces 74b on the washer is at least equal to the lead of the threads 72g but less than the lead of the cam surfaces 72d on the head portion of the cap screw. According to the invention, after the cap screw and washer combination have been tightened onto the top of the member 80 to a fully torqued position, the washer 74 is held stationary by a suitable wrench engaging wrenching flats 74a and the cap screw is backed off a small amount by the use of a wrench engaging wrenching flats 72c to relieve the residual torque in the screw. The screw is preferably backed off by approximately 5 degrees to allow the ledges 72e on the head portion of the screw to move into a spaced relation relative to the ledges 74c on the washer.

As the screw is backed off relative to the washer, the hard edges of the cam surfaces on the head portion of the cap screw dig into the soft surfaces of the cam surfaces 74b of the washer to lock the cap screw relative to the washer and prevent the cam surfaces from sliding back to their fully torqued position.

The invention locking fastener assembly will be seen to provide many advantages. Specifically, the invention locking fasteners eliminate locked in stresses and deflections working to loosen the nut and substitute stresses and deflections working to tighten the nut; they permit locking teeth or other forms to be embedded in the seat of the nut and in the seat of the washer at assembly to provide positive locking against loosening; they eliminate the need to be concerned about relative coefficients of friction between the various elements since variations in this regard do not affect the locking effectiveness of the fastener assembly; they provide a means of visual inspection to ensure that the final reverse tightening operation has been performed; they enable the bolt tension or clamping force to be controlled within very close limits; they facilitate the use of coarser threads which permits faster assembly and reduces thread stripping, particularly in weaker material; and the cost of the assembly is very competitive relative to other locking fastener assemblies.

The locking fastener assembly of the invention in effect provides a "vernier control" over the clamping force and overall joint deformation present in the joint following the final tightening or backing off operation. The joint designer may thus achieve a selective, finely calibrated control of the amount of compression added to the joint as a result of the final tightening operation by carefully controlling the parameters of the joint such for example as the differential lead as between the cam surfaces on the respective annular fastener elements, the differential lead as between the cam surfaces on the annular fastener elements and the thread of the associated threaded element, and the hardness or softness of the materials of the respective annular fastener members. Given a specified differential as between the lead of the cam surfaces on one annular fastener as compared to the lead of the cam surfaces on the confronting annular fastener, a specified differential as between the lead of the ca surfaces on the annular fasteners and the lead of the thread of the associated fastener element, and a given differential and hardness as between the materials of the annular fasteners, the designer can provide a precise amount of clamping force and overall joint deformation following the final tightening or backing off operation with the precise magnitude of the clamping force and overall joint deformation increasing precisely and selectively in proportion to the degrees of backing off movement during the final tightening operation. As previously indicated, only a small amount of reverse rotation during the final tightening operation is sufficient to remove all loosening forces and deformations in the assembly and actually reverse these forces and deformations to the point where they are working in a direction to increase the clamping force. The reaction torque that creates these forces must be taken by the cam faces which are working to close the spaces which have been opened up between the confronting ledges in the final backing off operation. It is therefore imperative that no closing of the final tightening space or gap occur during usage. The final tightening operation in effect permanently locks in thread forces that are normally dissipated over time in conventional threaded joints but the thread forces that are locked in according to the present invention are not dissipated over time since they can only be dissipated by reducing the size of the gaps or spaces opened by the final tightening operation and this reduction is precluded by the locking means of the invention.

Whereas preferred embodiments of the invention may be illustrated and described in detail it will be apparent that various changes may be made and disclosed in embodiments without departing from the scope or spirit of the invention.

I claim:

1. An annular locking fastener assembly adapted for coaction with an elongated threaded fastener, said assembly comprising:
   a first annular member defining a first annular face;
   a second annular member defining a second annular face; and
   coacting means on said faces operative in response to relative rotation of said members in one direction with said faces in confronting relation to lockingly engage said faces in a sense to preclude retrograde relative rotation of said members in the opposite direction,
   said coacting means comprising a plurality of angled circumferentially spaced first cam surfaces on said first annular face and a plurality of angled circumferentially spaced second cam surfaces on said second annular face having a lead greater than the lead of said cam surfaces on said first annular face.

2. A fastener assembly according to claim 1 wherein:
   said first annular member is formed of a relatively soft material; and
   said second annular member is formed of a relatively hard material.

3. A fastener assembly according to claim 1 wherein:
   said first member is a nut having internal threads with a lead equal to or less than the lead of said first cam surfaces;
   said first cam surfaces are defined on the lower annular face of said nut;
   said second member is a washer; and
   said second cam surfaces are defined on the upper annular face of said washer.

4. A fastener assembly according to claim 3 wherein:
   said washer has wrenching flats at its outer periphery.

5. A fastener assembly according to claim 4 wherein: the effective diameter of said washer wrenching flats is greater than the effective diameter of the wrenching flats on said nut.

6. A fastener assembly according to claim 3 wherein: said washer has serrations on its lower face.

7. A fastener assembly according to claim 1 wherein: said first member is constituted by a first washer; said second member is constituted by a second washer; said first cam surfaces are defined on the lower annular face of said first washer; and said second cam surfaces are defined on the upper annular face of said second washer.

8. A fastener assembly according to claim 7 wherein: each of said washers has wrenching flats at its outer periphery.

9. A fastener assembly according to claim 8 wherein: the wrenching flats on said second washer have a greater effective diameter than the wrenching flats on said first washer.

10. A fastener assembly according to claim 8 wherein: said fastener assembly further includes a nut having wrenching flats having the same effective diameter as the wrenching flats on said first washer and having internal threads having a lead equal to or less than the lead of said cam surfaces.

11. A fastener assembly according to claim 10 wherein: said first washer has serrations on its upper face and said second washer has serrations on its lower face.

12. An annular locking fastener assembly adapted for coaction with an elongated threaded fastener, said assembly comprising:
a first annular member defining a first annular face;
a second annular member defining a second annular face; and
coacting means on said faces operative in response to relative rotation of said members in one direction with said faces in confronting relation to lockingly engage said faces in a sense to preclude retrograde relative rotation of said members in the opposite direction;
said first annular face on said first annular member including a plurality of angled circumferentially spaced first cam surfaces separated and delineated by a plurality of generally radial ledges;
said second annular face on said second annular member including a plurality of angled circumferentially spaced second cam surfaces separated and delineated by a plurality of generally radial ledges and conforming in number to said first cam surfaces;
said coacting means comprising at least one tooth on at least one cam scarce of one of said members sized and configured for locking coaction with the other member and operative in response to relative rotation of said members in a direction to move said first surfaces up said second surfaces to lockingly engage a cam surface on the other member to preclude retrograde relative rotation of said members.

13. An annular locking fastener assembly comprising:
a fastener member having threads;
a washer defining a first annular face;
means defining a second annular face; and
coacting means on said faces operative in response to relative rotation of said members in one direction with said faces in confronting relation to lockingly engage said faces ana sense to preclude relative rotation of said faces in a retrograde direction,
said coacting means comprising a plurality of angled circumferentially spaced first cam surfaces on said first annular face having a lead at least equal to the lead of said threads and a plurality of angled circumferentially spaced second cam surfaces on said second annular face having a lead greater than the lead of said cam surfaces on said first annular face.

14. A fastener assembly according to claim 13 wherein:
said washer is formed of a relatively soft material; and
said second annular face is formed of a relatively hard material.

15. A fastener assembly according to 14 wherein: said threaded fastener is a nut; and
said second set of cam surfaces are defined on the lower face of said nut.

16. A fastener assembly according to claim 14 wherein:
said threaded fastener is a bolt having a head; and
said second set of cam surfaces are defined on the lower face of the head of the bolt.

17. A fastener assembly according to claim 13 wherein:
said second set of cam surfaces is defined on the lower face of said threaded fastener member.

18. An annular locking fastener assembly adapted for coaction with an elongated threaded fastener, said assembly comprising:
a first annular member defining a first annular face;
a second annular member defining a second annular face; and
coacting means on said faces operative in response to relative rotation of said members in one direction with said faces in confronting relation to lockingly engage said faces in a sense to preclude retrograde relatively rotation of said members in the opposite direction;
said coacting means being operative in response to relative rotation of said members in said one direction to create spaces between confronting ledges on said members; and
said assembly further including wedge means sized to fit into said spaces so as to further preclude retrograde relative rotation of said members in said opposite direction.

19. An annular locking fastener assembly according to claim 18 wherein:
said wedge means comprise a snap ring having end portions sized to fit into opposed spaces created during the relative rotation of said members in said one direction.

20. An annular locking fastener assembly comprising:
a first annular member defining a first annular face having a plurality of first generally radially extending ledges;
a second annular member defining a second annular face having a plurality of second generally radially extending ledges movable into respective abutting engagement with said first radially extending ledges in response to relative rotation of said members in one direction with said faces in confronting relation and movable out of respective abutting engagement with said first radially extending ledges in response to relative rotation of said members in the opposite direction to define a plurality of circumferentially spaced spaces between said first and second ledges; and wedge means sized to fit in said spaces to preclude retrograde relative movement of said members in said one direction.

21. An annular locking fastener according to claim 20 wherein said wedge means comprises a snap ring having end portions adapted to be fitted into generally diametrically opposed spaces.

22. A fastener assembly comprising:

a first annular member defining a lower annular face having a plurality of angled circumferentially spaced cam surfaces;

a second annular member defining an upper annular face having a plurality of angled circumferentially spaced cam surfaces; and coacting means on said faces, including means defining a plurality of generally radially extending edges on one of said faces, operative in response to relative rotational movement between said members in a predetermined direction to lockingly engage said edges with the cam faces of the other member to preclude retrograde relative rotation of said members in the opposite direction.

23. An annular fastener assembly adapted for coaction with a threaded fastener and including first and second annular members having coacting and confronting wedge cam surfaces having a lead greater than the lead of the threaded fastener so that backing off rotation of one member relative to the other member following tightening of the joint moves the cam surfaces on the one member upwardly on the cam surfaces on the other member to increase the tension in the threaded fastener, characterized in that the assembly includes locking means operative to preclude retrograde movement of the cam surfaces on the one member downwardly on the cam surfaces of the other member following the backing off operation.

24. A method of providing a threaded joint that is resistant to loosening comprising:

providing a first annular member having a plurality of cam surfaces separated by generally radially extending ledges;

providing a second annular member having a plurality of cam surfaces separated by generally radially extending ledges;

tightening said members together in a first direction to tighten the assembly with said first ledges abutting said second ledges;

backing off said first member relative to said second member to move said first and second ledges out of abutting engagement and create a plurality of circumferentially spaced spaces defined between respective pairs of first and second ledges; and locking said members in their backed off positions.

25. A method according to claim 24 wherein:

said locking step is accomplished by establishing a lead differential as between the cam surfaces of said first annular member and the cam surfaces of said second annular member.

26. A method according to claim 24 wherein:

said locking step comprises providing at least one tooth on at least one cam surface of one of said members sized and configured for locking coaction with the other member in response to the backing off movement of said members.

27. A method according to claim 24 wherein:

said locking step is accomplished by inserting wedge means in said spaces following the backing off operation.

28. A method of providing a threaded joint that is resistant to loosening comprising:

providing an annular fastener assembly including a threaded fastener member, a first annular face defining a plurality of circumferentially spaced first cam surfaces having a lead equal to or greater than the lead of the threads of the fastener member, and a second annular face confronting said first annular face and defining a plurality of circumferentially spaced second cam surfaces corresponding in number to said first cam surfaces but having a lead greater than the lead of said first cam surfaces;

turning said threaded fastener member in a tightening direction relative to an associated threaded device and moving said cam surfaces down each other to decrease the overall height of the fastener assembly; and thereafter turning said threaded fastener member in a loosening direction relative to the associated threaded device while moving said cam surfaces up on each other to lockingly engage said cam surfaces.

29. A method according to the claim 28, including the further steps of:

forming said first annular face of a relatively soft material; and forming said second annular face of a relatively hard material, so that said second cam surfaces are driven into said first cam surfaces as said threaded fastener member is loosened.

30. A method according to claim 29 including the further steps of:

forming said second annular face as the upper face of a washer having flat wrenching sides so that the washer may be held against rotation as said threaded fastener member is moved in the loosening direction.

31. A method of providing a threaded joint that is resistant to loosening by providing a threaded fastener and providing first and second annular members having coacting and confronting wedge cam surfaces having a lead equal to or greater than the lead of the threaded fastener so that backing off rotation of one of the members relative to the other member maintains or increases the tension in the thread fastener, characterized in that the one member is locked in its backed off position relative to the other member.

* * * * *

UNITED STATES PATENT AND TRADEMARK OFFICE
CERTIFICATE OF CORRECTION

PATENT NO. : 5,090,855
DATED : February 25, 1992
INVENTOR(S) : Sydney L. Terry It is certified that error appears in the above-identified patent and that said Letters Patent is hereby corrected as shown below:

Column 2, Line 9, Please delete "ca" and insert -- cam --.

Column 5, Line 34, Please delete "16c the " and insert -- 16c on the --.

Column 8, Line 67, Please insert after "As" -- the upper washer 24 is backed off relative to the lower --.

Column 10, Line 61, Please delete "50o" and insert -- 5° --.

Column 11, Line 19, Please delete "create din" and insert -- created in --.

Column 13, Line 11, Please delete "ar" and insert -- are --.

Column 15, Line 67, Please delete "ca" and insert -- cam --.

Column 17, Line 55, Please delete "scarce" and insert -- surface --.

Column 18, Line 2, Please delete "ana" and insert -- in a --.

Signed and Sealed this

First Day of June, 1993

Attest:

MICHAEL K. KIRK

*Attesting Officer*  *Acting Commissioner of Patents and Trademarks*